(12) United States Patent
Steil (10) Patent No.: US 10,326,288 B2
(45) Date of Patent: Jun. 18, 2019

(54) METHOD AND DEVICE FOR THE VOLTAGE-CONTROLLED SELF-DEACTIVATION OF ELECTRONIC COMPONENTS OR BATTERY CELLS

(71) Applicant: Robert Bosch GmbH, Stuttgart (DE)

(72) Inventor: Michael Steil, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 15/028,901

(22) PCT Filed: Sep. 30, 2014

(86) PCT No.: PCT/EP2014/070864
§ 371 (c)(1),
(2) Date: Apr. 12, 2016

(87) PCT Pub. No.: WO2015/055417
PCT Pub. Date: Apr. 23, 2015

(65) Prior Publication Data
US 2016/0254686 A1 Sep. 1, 2016

(30) Foreign Application Priority Data

Oct. 14, 2013 (DE) .................. 10 2013 220 730

(51) Int. Cl.
*H02J 7/00* (2006.01)
*B60L 3/00* (2019.01)
(Continued)

(52) U.S. Cl.
CPC .......... *H02J 7/0026* (2013.01); *B60L 3/0046* (2013.01); *B60L 3/04* (2013.01); *B60L 58/12* (2019.02);
(Continued)

(58) Field of Classification Search
CPC ....................................................... H02J 7/00
(Continued)

(56) References Cited

U.S. PATENT DOCUMENTS 3,454,859 A 7/1969 Ford et al.
3,707,664 A 12/1972 Esch
(Continued)

FOREIGN PATENT DOCUMENTS

CN 103229386 A 7/2013
DE 102010046616 3/2012
(Continued)

OTHER PUBLICATIONS

International Search Report for Application No. PCT/EP2014/070864 dated Feb. 12, 2014 (English Translation, 2 pages).

*Primary Examiner* — Mohammed Alam
(74) *Attorney, Agent, or Firm* — Michael Best & Friedrich LLP (57) ABSTRACT

The invention relates to a method for the voltage-controlled deactivation of battery cells (22) within a battery module (34, 38) or a battery pack (48) and for the voltage-controlled deactivation of electronic components (40, 52.1-52.8, 54) which are electrically connected to the battery cells and which are supplied with power by the battery cells. If a voltage falls below a threshold in the battery cells (22), supply lines (44, 46, 68, 70) to the electronic components (40, 52.1-52.8, 54) are automatically interrupted and/or battery cells (22) of the battery modules (34, 38) are separated from the main current circuit of the battery or of a battery pack (48).

10 Claims, 4 Drawing Sheets

(51) Int. Cl.
*B60L 3/04* (2006.01)
*H01M 10/44* (2006.01)
*B60L 58/14* (2019.01)
*B60L 58/12* (2019.01)
*B60L 58/21* (2019.01)
*B60L 58/20* (2019.01)

(52) U.S. Cl.
CPC ............... *B60L 58/14* (2019.02); *B60L 58/20* (2019.02); *B60L 58/21* (2019.02); *H01M 10/441* (2013.01); *H02J 7/0031* (2013.01); *H02J 7/0068* (2013.01); B60L 2240/545 (2013.01); B60L 2240/547 (2013.01); B60L 2240/549 (2013.01); H01M 2220/20 (2013.01); H02J 7/0065 (2013.01); H02J 2007/004 (2013.01); H02J 2007/0067 (2013.01); Y02T 10/7005 (2013.01); Y02T 10/7044 (2013.01); Y02T 10/7061 (2013.01)

(58) Field of Classification Search
USPC .......................................................... 320/112
See application file for complete search history.

(56) References Cited

U.S. PATENT DOCUMENTS

| | | |
|---|---|---|
| 4,698,578 A | 10/1987 | Mullersman et al. |
| 5,142,162 A | 8/1992 | Sundeen et al. |
| 2005/0237686 A1 | 10/2005 | Satoh et al. |
| 2009/0066291 A1 | 3/2009 | Tien et al. |
| 2009/0184682 A1 | 7/2009 | Kosugi et al. |
| 2010/0141219 A1* | 6/2010 | Li .................... H01M 10/441 320/162 |
| 2010/0253286 A1 | 10/2010 | Sutardja |
| 2012/0086402 A1* | 4/2012 | Carder ................ H02J 1/108 320/118 |
| 2012/0187897 A1* | 7/2012 | Lenk .................. H01M 10/44 320/101 |
| 2012/0274142 A1* | 11/2012 | Tinglow ............... H02J 7/0026 307/77 |
| 2012/0319658 A1* | 12/2012 | White ................. H02J 7/0016 320/134 |
| 2014/0015488 A1* | 1/2014 | Despesse .......... H01M 10/425 320/122 |
| 2015/0180257 A1* | 6/2015 | Snyder ............... H01M 10/441 320/103 |
| 2016/0226288 A1* | 8/2016 | Kuroda ............... H02J 7/0081 |
| 2016/0233555 A1* | 8/2016 | Pedtke ............... H01M 10/425 |
| 2016/0254686 A1* | 9/2016 | Steil ..................... B60L 3/0046 320/112 |

FOREIGN PATENT DOCUMENTS

| | | |
|---|---|---|
| DE | 112010001505 | 5/2012 |
| EP | 316648 | 5/1989 |
| EP | 542365 | 5/1993 |
| WO | 2010080017 | 7/2010 |

* cited by examiner

METHOD AND DEVICE FOR THE VOLTAGE-CONTROLLED SELF-DEACTIVATION OF ELECTRONIC COMPONENTS OR BATTERY CELLS

BACKGROUND OF THE INVENTION

U.S. Pat. No. 5,142,162 discloses a control system for the electrical system of a vehicle, the battery being separated from an electrical load in order to avoid an exhaustive discharge of the battery. For this purpose, the battery is connected to a transistor which, as the switch, either connects parasitic loads to the battery or separates them from the battery.

EP 0 542 365 A1 discloses a circuit in which a battery is protected by a field-effect transistor (MOS-FET) against an exhaustive discharge. According to EP 0 542 365 A1, the field-effect transistor enables the load to be supplied by the battery for as long until the battery voltage of the battery drops below a specified voltage value (gate-to-source cut) of the field-effect transistor.

US 2005/0237686 A1 relates to a method for avoiding exhaustive discharges of a secondary battery. According to this method, a switching element is connected in series with the secondary battery. If the battery is discharged below a predetermined voltage level, the switching element separates the secondary battery from the load circuit. According to this solution, a Schmitt trigger, in particular, is used as switching element.

WO 2010/080017 A1 relates to an electronic protection circuit which prevents an exhaustive discharge of car batteries.

In general, traction batteries for use in electric drives of vehicles are constructed in accordance with the current state of the art as described in the text which follows: a small unit forms the actual energy cell. This comprises, for example, components with Li ($Ni_x$, $CO_y$, $Mn_2$) $O_2$ mixed with $LiMn_2O_4$ or $LiFePO_4$ as active materials. As a consequence of its chemical-physical nature, such a battery cell has a voltage range which lies between 2.8 volts-4.2 volts. If such a battery cell is fully charged, which corresponds to an SOC of 100% (SOC=State of charge [Ah] divided by the maximum capacity possible according to the current service life of the cell [Ah times 100%]), the open circuit voltage of such a battery cell is usually 4.2 volts.

Such battery cells should not be operated outside their voltage range since otherwise the battery cell can be damaged with partially safety-critical consequences. The battery cells which are installed in accordance with the state of the art have—as described above—a voltage range between, for example 2.8 volts-4.2 volts. At lower temperatures, thus for example, at temperatures around about −25° C., the lower limit of operation can be lowered to 2.1 volts in most cases due to the higher internal impedance of the battery cell in order to provide for a voltage dip when performing a cold start, for example of a hybrid vehicle.

In general, accumulator cells (battery cells) have a typical open terminal voltage characteristic (OCV ≙ Open Circuit Voltage) in dependence on the dispersed capacity between positive cathode and negative anode.

In traction batteries as are used for electric drives of vehicles, the battery cells can usually be operated within a particular charge window. A charge window is given, for example, by an SOC window, with SOC of 90% down to a lower level of a state of charge SOC of 10%. Corresponding state-of-charge windows, i.e. SOC windows, are adapted to the respective all chemistry of a battery cell and provide for an acceptable aging characteristic. However, it has been found that the further the state-of-charge limits (SOC limits) are extended, the worse an aging characteristic is obtained with a battery cell in operation. In the case where battery cells are discharged further than the lower limit of the state of charge SOC of 10% SOC, the battery cell voltage breaks down very rapidly to very low values. If the voltage of a battery cell has dropped below such a state of charge, this is an exhaustively discharged battery cell. In this case, the corresponding battery cell can be damaged reversibly or irreversibly depending on the chemical construction. In this case, a normal re-use of such a battery cell represents a safety-critical state.

In this case, repair of a corresponding battery pack is required which, as a rule, is associated with an exchange of the battery cells affected. A correspondingly affected electric vehicle or hybrid vehicle must then be classified as a broken down vehicle. This means that an exhaustive discharge of individual battery cells installed within a battery pack should be avoided if possible since great costs are caused and a not inconsiderable damage to the image could arise.

SUMMARY OF THE INVENTION

According to the invention, a device for the voltage-controlled activation or deactivation of electronics supplied with power from the battery cells within a battery module or within a battery pack is proposed, comprising a number of electrically interconnected battery cells which are connected to one another in series connection or in parallel connection or in matrix interconnection via connecting elements such as, for example, cell connectors or module connectors. Such electrically interconnected battery cells are connected via measuring lines and via supply lines, wherein measuring lines can also be used at the same time as supply lines, to electronic components which are supplied directly from these battery cells. The device is designed as a voltage-controlled switch which is integrated into the supply lines and comprises a semiconductor component. Following the solution proposed according to the invention, these electronics are disconnected in a voltage-controlled manner from the battery cells before supplying these electronics components with power ultimately causes an exhaustive discharge.

The voltage-controlled switch represents a hardware circuit which is permanently connected to the high-voltage side of the battery pack or the battery module, respectively, and is integrated into the supply path of the electronics, the voltage-controlled switch completely isolating the respective circuit from this supply path when the voltage drops below a certain supply voltage. The supply paths are reactivated automatically only when a certain supply voltage is exceeded. The semiconductor component relates to, in particular, relatively simple and robust semiconductor components such as, for example, transistors, field-effect transistors (MOS-FET) or also Schmitt triggers. By integrating the voltage-controlled switch into the supply paths, the probability of expensive repair or exchange processes of battery packs and the handling of guarantee claims can be greatly reduced.

Due to the solution proposed according to the invention, comprising a device for voltage-controlled activation or deactivation of electronics which are supplied from battery cells, disturbances due to undefined software state transitions can be prevented in the case of software-activatable and -deactivatable circuits and controllers on the high-voltage side of a battery pack. If the vehicle is parked, for example, and controllers on the low-voltage side of the battery pack are deactivated in the parked state, they exhibit a low consumption of quiescent current. It has been found that the software-controlled activating and deactivating of the circuit parts arranged on the high-voltage side cannot be guaranteed with absolute reliability. Errors in the software code or software state transitions not considered or tested can trigger faulty activation processes in the circuits described or prevent that the activation processes are deactivated or deactivation processes are carried out correctly. In consequence, the faultily activated circuit, due to the normal operating current, causes an excessively strong discharging of the battery cells in contrast to the quiescent current in the deactivated state. Even with relatively short service times, this can lead to the battery cells being exhaustively discharged and, as a result, destroyed. Due to the voltage-controlled activation or deactivation, connected upstream according to the invention, of the electronics to or from the battery cells, respectively, it is ensured that the exhaustive discharge phenomena described cannot even occur at all due to a guaranteed deactivation.

By using a voltage-controlled switch, the electronics connected to battery cells, the cells being interconnected within battery modules or battery packs, are reliably disconnected, and thus deactivated, when the voltage from their supply lines drops below a certain voltage level.

As a result, it can be achieved with relatively little expenditure that the battery cells can no longer be discharged creepingly and thus exhaustively discharged.

The voltage-controlled switch can comprise, for example, resistors which are dimensioned in such a manner that a semiconductor component such as, for example, a transistor, is cut off when the voltage drops below a selected voltage, and thus deactivates the supply voltage for the downstream entity. Instead of a transistor or of a field-effect transistor, a Schmitt trigger can also be used by means of which the supply voltage for downstream entities can be activated and deactivated even more precisely.

In a further embodiment of the concept forming the basis of the invention, a module controller is allocated to each battery module of a battery pack of a traction battery, which controller comprises the voltage-controlled switch proposed according to the invention.

The electronics contacted permanently are isolated under voltage control from the battery cells which supply them, or are connected to them, by the solution proposed according to the invention. One possibility of implementing this lies in using a voltage-controlled switch which is accommodated in the supply line to the electronics, ideally directly on its circuit board in the supply path. The interconnection of individual battery cells with one another remains. In this case, no modules of the battery pack are separated from the actual circuit of the battery.

The individual module controllers in each case allocated to the battery modules are connected via a communication bus to a higher-level entity, for example to a battery control unit (BCU). The supply voltage lines extending between the individual battery modules and the module controller allocated in each case thereto connect the respective module controller electrically to the associated module. On the circuit board of the module controller, the voltage-controlled switch can be accommodated, for example. On the other hand, the possibility exists of designing the latter as a separate circuit, circuit box or the like. In this case, the supply lines, coming from the cells, extend into this upstream entity and leave the upstream entity again in order to thereafter contact the supply lines of the electronics, for example of the module controllers and/or of the battery control unit (BCU).

In addition, the present invention discloses a method for the voltage-controlled activation or deactivation of battery modules or battery cells of a battery pack. In this context, deactivation of a battery module or of at least one battery cell takes place by a voltage-controlled switch which, when the voltage drops below an applied minimum voltage in its module or in the cell, electrically separates the voltage lines coming from the module to the interfaces to the next modules or, respectively, the voltage lines within the cell to the cell terminals on the outside of the cell. Or in the case where a minimum voltage in the battery module or in the battery cell, respectively, is exceeded, triggers a connection of a previously disconnected battery module or of a battery cell, respectively, to the battery pack. In this case, a voltage-controlled connecting or disconnecting of battery cells or battery modules can be implemented by the fact that at least one voltage-controlled switch or a Schmitt trigger can be integrated into a battery cell itself or into the current path of the battery module, respectively. By this means, battery cells or entire battery modules, respectively, which are located at the exhaustive discharge limit are taken physically out of the energy provision into the high-voltage circuit of the vehicle. For the implementation of this circuit, a semiconductor element should preferably be selected which has a low voltage drop at the given operating current.

If the battery cells of a battery module have reached a low voltage level but not suffered any exhaustive discharge, the connected battery cells have arrived at the lower end of their state of charge (SOC) and have an extremely low voltage. This voltage, from which onward the deactivation described becomes effective, must be selected in such a manner that it is below a lower limit, defined in a software, for the normal battery cell operation so that the control software is not impaired by circuits deactivating themselves during a normal operation.

If, however, the voltage level once drops to a level which is below the lower voltage limit required for normal operation and at which the self-deactivation of the connected electronics has been triggered, the battery pack can usually no longer be connected to the high-voltage network of the vehicle. Since main breakers remain open, there is no possibility to recharge the battery pack or the battery module, respectively, or individual battery cells contained in it and having a low voltage level, to voltage levels suitable for normal operation. This can be by-passed by allowing the addition of the relevant battery pack by a corresponding design of the software. Since the voltage-controlled switch implemented in the individual module controllers ensures that the battery cells of a battery module are not exhaustively discharged, the possibility exists to charge the battery cells having a very low voltage state again by means of a gentle charging current. A gentle charging current can be implemented, for example, by selecting a low current as charging current depending the capacity C of the battery cell. This can amount to one tenth to one third of the capacity of the battery cell. In the case of a 24 Ah battery cell, a gentle charging current would be given by about 2.4 ampere to approx. 8 ampere.

As soon as the charging voltage is present in the voltage supply lines to the battery modules, the self-deactivation previously effected is cancelled and those circuits or battery cells or battery modules which have previously been deactivated automatically operate again without accepting waiting times.

Due to the solution proposed according to the invention, both due to the device for the voltage-controlled activation or deactivation of electronics to battery cells, to battery modules or to a sum of battery modules or all modules of a battery pack, and the method proposed according to the invention for the voltage-controlled activation or deactivation of battery cells, battery modules or a sum of battery modules or all modules of a battery pack to this battery pack, the error pattern of completely exhaustively discharged battery cells can be excluded. By this means, a very large cost savings potential can be achieved and the availability of battery packs in traction batteries can be considerably enhanced. By integrating a voltage-controlled switch in the module controller or in a battery control device, a reliable galvanic isolation of these electronics from the battery cells or from battery modules, respectively, can be achieved in a cost-effective manner. Due to the use of semiconductor components such as, for example, transistors, Schmitt triggers or field-effect transistors (MOS-FET), the implementation of the voltage-controlled switch does not represent any great additional expenditure but—quite on the contrary—the availability of battery systems can be enhanced considerably by the elimination of the exhaustive discharge error pattern by a quite simple hardware extension of the module controllers or of the battery control devices.

Implementing a voltage-controlled switch in the battery cell or in the current path of a module, respectively, results in further advantages for the reliability since the relevant battery cells or modules cannot be discharged below their lower voltage limit and deactivate themselves first even in active operation of the battery.

By means of the solution proposed according to the invention, expensive repair processes with an exchange of a battery cell or of a module, which has become necessary, can be excluded. Furthermore, very expensive recall actions, damaging to the reputation, by the vehicle manufacturer with a more frequent occurrence in operation can be avoided. Furthermore, the reliability of the lithium ion technology can be improved by the solution proposed according to the invention and thus its social acceptance can be improved enormously. Safety-critical conditions such as may occur, for example, due to exhaustively discharged battery cells no longer occur following the solution proposed according to the invention.

BRIEF DESCRIPTION OF THE DRAWINGS

In the text which follows, the invention will be described in greater detail by means of the drawings, in which.

DETAILED DESCRIPTION

Figure 1:
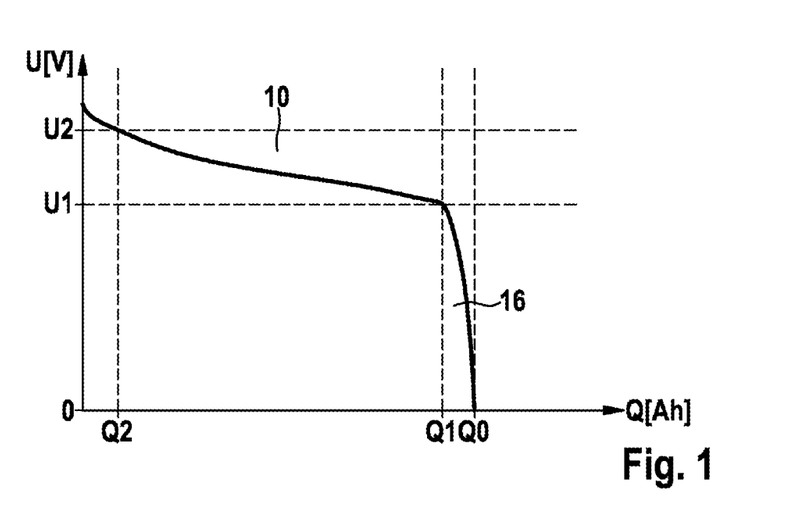
FIG. 1 shows a voltage curve in dependence on drawn charge with the example of a lithium ion battery cell.

FIG. 1 shows a voltage curve within a battery cell, the voltage being plotted in volts over the drawn capacity in Ah.

As can be seen in the representation according to FIG. 1, a charge window 10 is bounded, on the one hand, by a first capacity $Q_1$ and, on the other hand, by a second capacity $Q_2$, within the charge window 10, the voltage curve proceeds between a first lower voltage value $U_1$ and a second higher voltage value $U_2$. If the battery cells are discharged further via the first capacity $Q_1$, the battery cell voltage drops very greatly, indicated by the exhaustive discharge window 16, the relevant battery cell having a capacity $Q_0$ with the exhaustive discharge, i.e. being completely discharged. In this case, the relevant battery cell can be damaged reversibly or irreversibly depending on the chemical structure. It is then extremely critical to continue to operate the battery cell normally or to charge it up again.

According to the current state of the art, exhaustively discharged cells in a battery pack trigger, in each case in dependence on the depth of the discharge, a reaction of a battery management system which prevents the further operation of a battery pack affected in this manner. This then requires a repair of this battery pack which, as a rule, amounts to an exchange of the battery cells affected.

Figure 2:
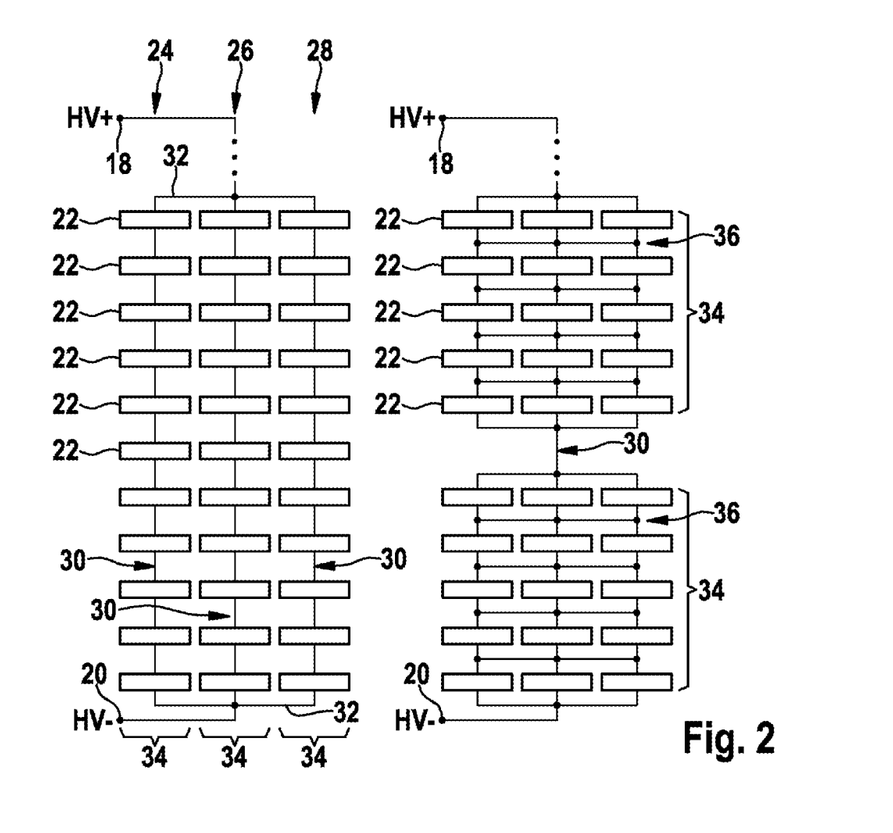
FIG. 2 shows the parallel connection in strings and a matrix circuit within battery modules.

The representation according to FIG. 2 shows a parallel connection in strings and a matrix interconnection of individual battery cells to form battery modules.

As can be seen in the representation according to FIG. 2, a number of battery cells 22 is in each case connected within a first string 24, a second string 26 and a third string 28 electrically to one another in a series interconnection 30. The individual strings 24, 26, 28, in turn, are arranged in parallel interconnection 32 with one another, the three strings 24, 26, 28 form a battery module 36 which is connected to a high-voltage terminal 18 (positive terminal) and a high-voltage terminal 20 (negative terminal).

Apart from the parallel interconnection 32 of individual strings 24, 26, 28 which, in turn, in each case comprise a number of battery cells 22 in series connection 30, there is the possibility of obtaining individual battery modules 34 by means of a matrix interconnection 36. The representation according to FIG. 2 shows that as part of the matrix interconnection 36, two or more battery modules 34, which in each case comprise a number of battery cells 22 in matrix interconnection 36, are in turn arranged in series interconnection 30 with reference to one another. The series-connected battery modules 34, in turn, are connected to the high-voltage terminals 18, 20 (positive, negative). The circuit possibilities shown in FIG. 2 enable a very high voltage, which is usually within the range of approximately 400 volts, to be generated which is needed for hybrid vehicle and electric vehicle drives. To implement a very high power and energy content, the strings 24, 26, 28 can be connected in parallel with one another.

Figure 3:
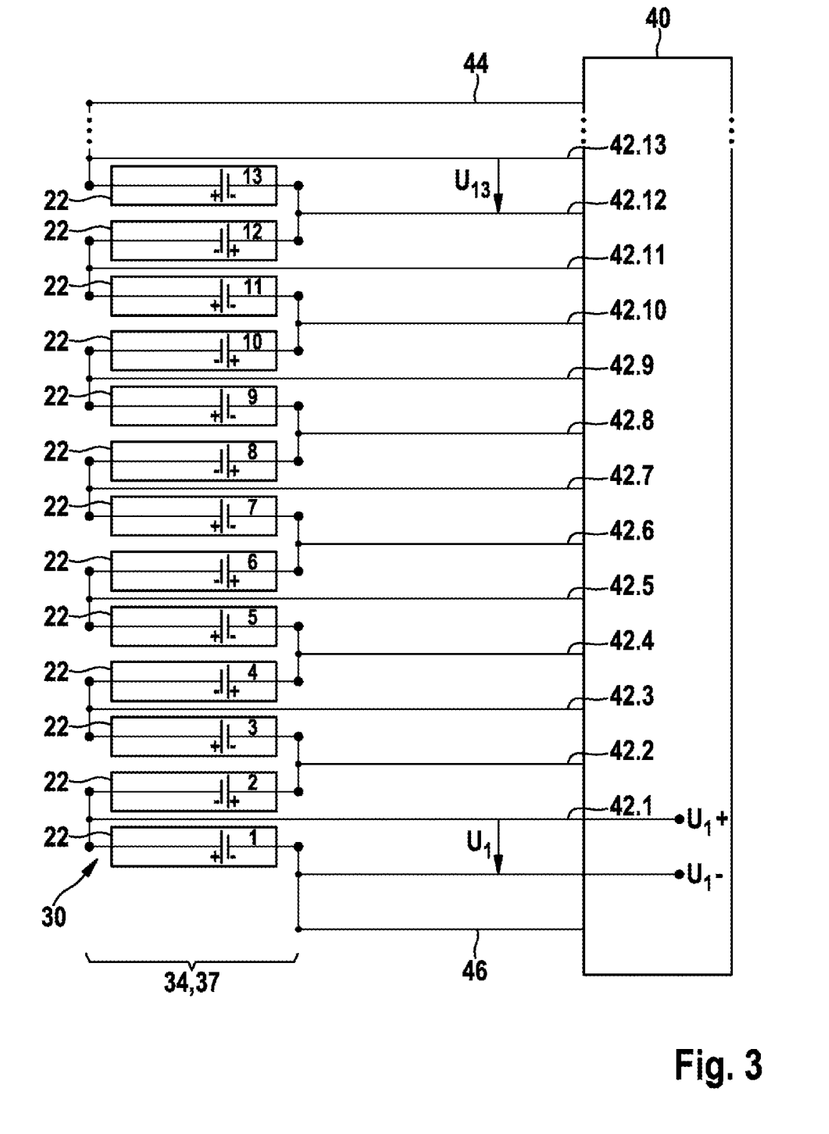
FIG. 3 shows a battery module in series interconnection with a module controller.

FIG. 3 shows a battery module in series interconnection which is connected to a module controller.

As a rule, as shown in FIG. 3, a number of individual battery cells 22 are connected together to form one battery module 34. The battery module 34 shown in FIG. 3 is a 13s1p module 37. Thirteen battery cells 22 are interconnected to one another in series, indicated by reference symbol 30, series interconnection, whereas the identifier 1p means that a cascade of series-connected battery cells 22 is connected in parallel. The battery module 34 or the 13s1p module 37, respectively, according to the representation in FIG. 3, is connected to a module controller 40. From the module controller 40, a supply voltage line 44 (positive) and a supply voltage line 46 (negative) extend to the in each case outer ones of the thirteen battery cells 22. As FIG. 3 also shows, each of the battery cells 22 has its own voltage measurement. Since thirteen battery cells 22 are accommodated in the battery module 34, the voltage measurement in each of the thirteen battery cells takes place via their own voltage measuring lines 42.1 to 42.13. This means that the voltage at each one of the thirteen battery cells 22 can be measured directly via the module controller 40. The module controller 40 measures the individual voltages of the battery cells 22 and their temperatures and is able to perform first approximate calculations. A number of the battery modules 34 shown in FIG. 3, in this case interconnected as 13s1p module 37, can be connected to form a battery pack 48 (compare representation according to FIG. 4). The module controller 40 shown in FIG. 3 has, as a rule, a circuit section which is supplied via the 12-volt on-board vehicle system and which, for example, contains communication interfaces such as a communication bus 50 (CAN), compare FIG. 4. As a rule, this part of the module controller 40 is connected electrically to the on-board vehicle system and can be activated and deactivated electrically according to DIN 72552—in order to mention an example. This represents the low-voltage range.

Figure 4:
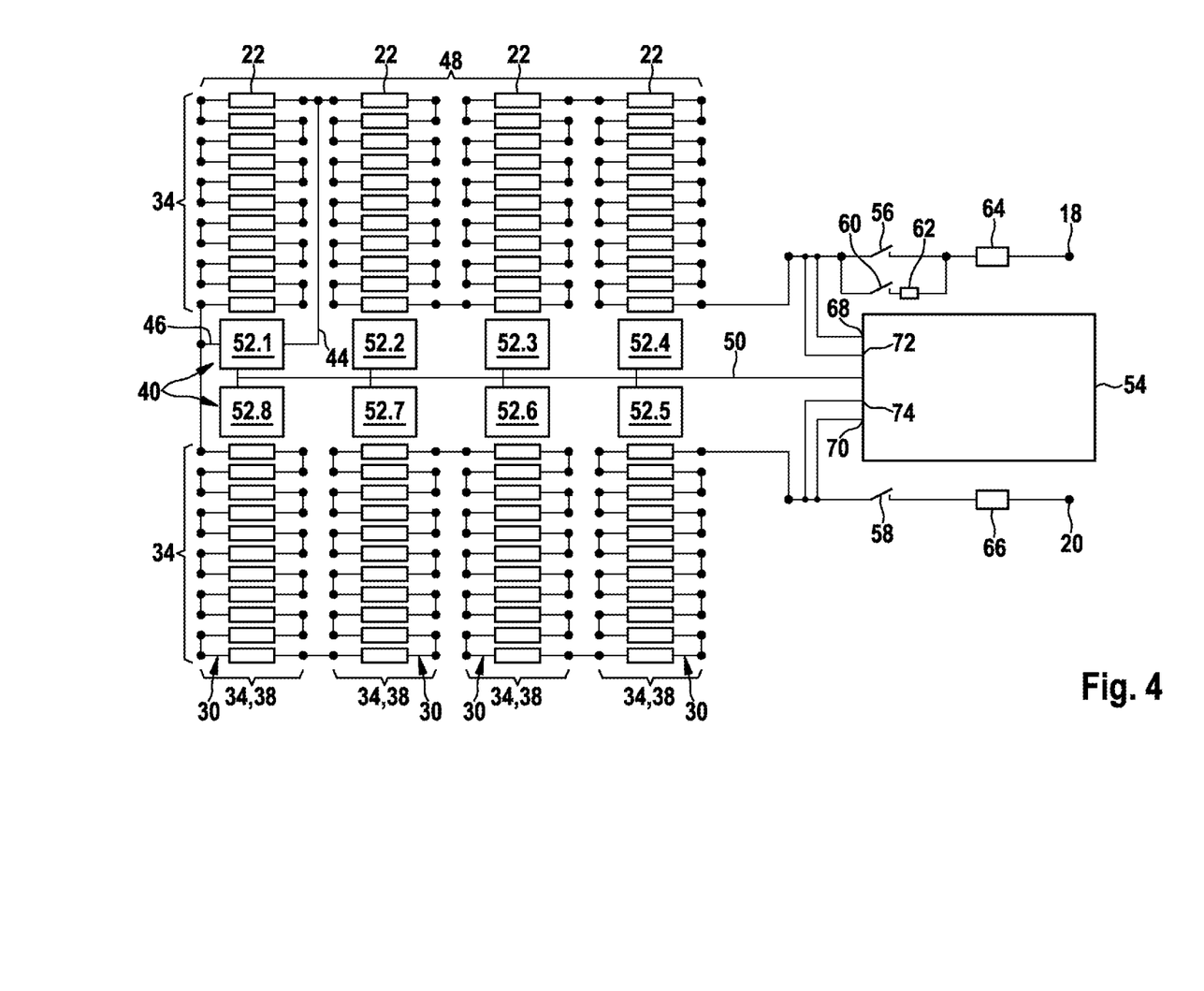
FIG. 4 shows a battery pack, comprising a number of battery modules with module controllers and a battery control unit

As a rule, both the module controllers 40 shown in FIGS. 3 and 4 and a battery control unit 54, shown by way of example in FIG. 4, comprise a circuit section which is connected directly to the battery cells 22 or, respectively, to points in the battery in order to monitor, for example, voltages. As a rule, these circuit sections are supplied from the high-voltage range to be measured of the battery system. If these circuit sections are activated, the battery cells 22 are discharged, for example in order to perform voltage measurements, process the results obtained and forward them to an entity which is supplied by the 12-volt on-board vehicle system. In normal operation, particularly in driving operation, this does not represent a challenge since the required performances, as a rule, are far below those performances which a battery pack 48—as shown by way of example in FIG. 4—is capable of performing.

FIG. 4 shows a battery pack which comprises a number of battery modules to which a module controller is allocated in each case, and a battery control unit (BCU) allocated to the battery pack.

As shown in FIG. 4, a battery pack 48 represented there comprises eight battery modules 34 which are interconnected as 11s1p module 38. 11s1p means that 11 battery cells 22 are connected in series and this cascade of battery cells 22, in turn, is connected in parallel. To each of the battery modules 34 of the battery pack 48, a module controller 52.1 to 52.8 is allocated. The module controllers 52.1 to 52.8, in turn, are connected to the battery control unit 54 (BCU) via a communication bus 50 which can be, for example, a CAN bus. Starting with the high-voltage terminals 18 and 20, high-current paths extend to the battery modules 34 which are in each case monitored by a module controller 52.1 to 52.8. In the high-current path which extends starting from the high-voltage terminals 18 and 20, respectively, a main switch positive, compare position 56, and a main switch negative, compare position symbol 58, are installed in order to achieve two-pole deactivation, i.e. a reliable isolation of the galvanic connection of the battery modules 34 of the battery pack 48 from the high-voltage terminals 18 and 20, respectively. In parallel with the main switch 56 on the positive side, an auxiliary switch 60 is located which is followed by a resistor 62. The reference symbols 64 and 66 in each case designate a first fuse and a second fuse which, for example, can be arranged at these positions. These interrupt the main circuit in the case of too high a current flowing.

The representation according to FIG. 4 also shows that the battery control unit 54 has supply voltage lines 68, 70 by means of which the electronics on the high-voltage side part of the battery control unit are supplied. In addition, the battery control unit 54 can have facilities which provide for a voltage measurement 72 at the highest potential and a voltage measurement 74 at the lowest potential. However, this voltage measurement can also take place through the supply voltage lines in which the voltage measurements 72 and 74, respectively, can take place. As already mentioned, the battery control unit 54 communicates with the individual module controllers 52.1 to 52.8 via the communication bus—preferably designed as a CAN bus.

Figure 5:
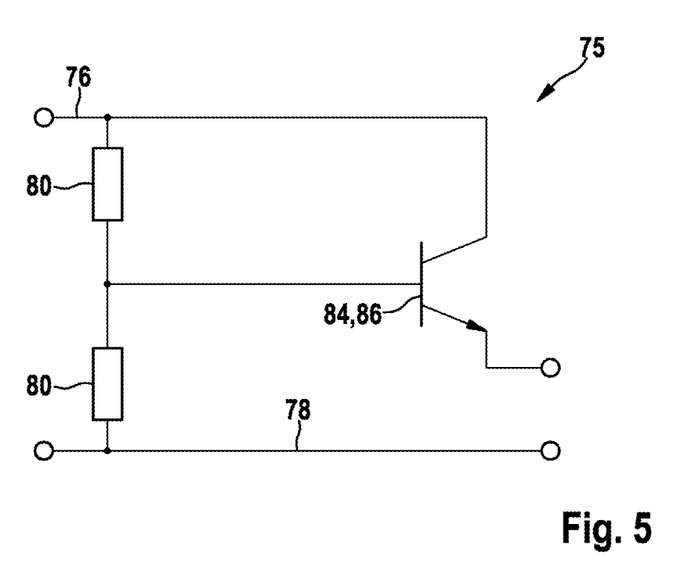
FIG. 5 shows a possible implementation of a voltage-controlled switch which is to be integrated into supply voltage lines.

FIG. 5 shows a possible embodiment of a voltage-controlled switch which can be integrated in the module controller 40 or the module controllers 52.1 to 52.8, respectively, according to the representation in FIG. 4. As shown in FIG. 5, a voltage-controlled switch 75 comprises a first supply voltage line 76 and a second supply voltage line 78. In addition, the voltage-controlled switch 75 has a first resistor 80 and a second resistor 82. The two resistors 80 and 82, respectively, operate as voltage dividers. The two resistors 80 and 82 are dimensioned in such a manner that a semiconductor component—in this case represented as a transistor 84—is cut off when the voltage drops below a selected voltage between the supply lines 76 and 78, and thus deactivates a supply voltage for downstream entities such as, for example, the module controller 40, 52.1 to 52.8 or the battery control unit 54 itself.

The semiconductor component 84 shown in FIG. 5, i.e. the transistor, can also be represented by a Schmitt trigger 86 or a semiconductor component such as, for example, a field-effect transistor (MOS-FET). When a Schmitt trigger 86 is used as semiconductor component, a more precise activation and deactivation of the supply voltage can be ensured for downstream entities, particularly the module controller or controllers 40, 52.1 to 52.8.

In the case of the method, also proposed according to the invention, for the voltage-controlled activation or deactivation of battery cells or battery modules of a battery pack, when the voltage drops below a minimum voltage present in the lines of the battery module to the adjacent battery modules, this battery module is deactivated by the voltage-controlled switch 75 shown in FIG. 5, which, in the embodiment according to FIG. 5, comprises a transistor 84 as semiconductor component.

If, in contrast, the applied minimum voltage at the deactivated battery module is exceeded again, the previously deactivated battery module is activated.

When the supply voltage drops below a minimum voltage and/or below a voltage value implemented in a software of the battery control unit, the battery cell 22 can be recharged with a gentle charging current so that an exhaustive discharge of the battery cells 22 of a battery module 34, 37, 38 is reliably prevented. A gentle charging current is understood to be a current depending on the capacity of the respective battery cell 22. In the case of a 24 Ah battery cell, for example, the charging current is between 2.4 A and 8 A.

By using the voltage-controlled switch 75 in the individual module controllers 40 according to FIG. 3 and 52.1 to 52.8 in FIG. 4, the connected battery cells 22 can remain protected from an exhaustive discharge. In the case of a fault—depending on the design of the implementation—they have a very low state of charge and a very low voltage. By correspondingly dimensioning the components, this low voltage should be selected in such a way that this voltage is below the lower limit, used in the software, for the normal operation of the battery module 34, 37, 38. This ensures that the software is not impaired during the normal operation by hardware parts deactivating themselves.

Once the voltage drops below the lower limit defined in the software, a battery pack 48 usually can no longer be connected to the on-board vehicle system via main switch or main relay 56, 58, respectively. As a rule, main breakers are open and there is no possibility of recharging battery packs 48, which have the low voltage level, back to normal operating voltages. This can be nevertheless circumvented in allowing the control software to connect the battery pack 48 since it is ensured that the battery cells 22 have not experienced an exhaustive discharge so that any associated safety risks can be ruled out. In this case, the battery cells 22 having a very low voltage level can be charged up again into the normal range by a gentle charging current which is dependent on the capacity of the respective battery cell 22. As soon as a charging device supplies a corresponding voltage externally to the battery module 34, 37, 38 or the battery pack 48, respectively, the self-deactivation produced previously is cancelled and the circuits which were previously deactivated, function again automatically without relatively long waiting or start-up times.

By means of the device proposed according to the invention, with a voltage-controlled switch and the method proposed according to the invention, the error pattern of exhaustively discharged battery cells 22 can be ruled out completely. By this means, a very large cost saving potential can be exploited and on the other hand, the availability of the battery pack 48 can be improved considerably—seen over its service life.

The invention claimed is:

1. A method for the voltage-controlled activation or deactivation of a plurality of battery cells within a battery module, the battery module having electronic components connected electrically to the battery cells, the method comprising:
preventing an exhaustive discharge of the plurality of battery cells by automatically interrupting supply lines to the electronic components and automatically separating, using an integrated voltage-controlled switch, the battery cells within the battery module from a main circuit of the battery pack when a voltage drops below a supply voltage of the battery cells;
charging, when the battery cells within the battery module are separated from the main circuit of the battery pack, a battery cell of the plurality of battery cells with a charging current when the cell voltage of the battery cell is below a predetermined voltage value, the charging current depending on the capacity of the battery cell,
and
reactivating the supply lines, using the integrated voltage-controlled switch, when the voltage exceeds the supply voltage.

2. The method as claimed in claim 1, wherein the at least one of the interruption or the separation takes place by at least one voltage-controlled switch.

3. The method as claimed in claim 1, wherein at least one battery module of the battery pack is allocated to a module controller.

4. The method as claimed in claim 2, wherein the voltage present at the electronic components triggers a switching process of the voltage-controlled switch.

5. The method as claimed in claim 4, wherein the switching process of the voltage-controlled switch for separating battery cells or battery modules from the main circuit of the battery pack is triggered when the voltage drops below a minimum voltage in the battery cells.

6. The method as claimed in claim 1, wherein the respective battery cell is returned back into its operating range in which normal operation occurs, by this charging current.

7. The method as claimed in claim 4, wherein the switching process of the voltage-controlled switch for separating electronic components is triggered by disconnecting the supply lines to the battery cells when the voltage drops below a minimum voltage in the battery cells.

8. A device for providing voltage-controlled activation or deactivation of battery cells, the device comprising:
a plurality of battery cells within a battery module having electronic components connected electrically to the battery cells;
wherein the battery module is allocated to a module controller a module controller; and
wherein the module controller is configured to prevent an exhaustive discharge of the at least one of the plurality of battery cells by automatically interrupting supply lines to the electronic components and automatically separating the at least one of the plurality of battery cells within the battery module from a main circuit of the battery pack, and
wherein the module controller is configured to charge, when the battery cells within the battery module are separated from the main circuit of the battery pack, a battery cell of the plurality of battery cells with a charging current when the cell voltage of the battery cell is below a predetermined voltage value, the charging current depending on the capacity of the battery cell.

9. The device of claim 8, wherein the battery cell and the battery modules comprise in each case a voltage-controlled switch configured to disconnect the battery cells or the battery modules, respectively, of the battery pack from the main circuit as soon as the voltage drops below a voltage threshold in the battery cells.

10. The device of claim 9, wherein the at least one voltage-controlled switch includes an item selected from a group consisting of a field-effect transistor and a Schmitt trigger.

* * * * *